(12) United States Patent
Hamman

(10) Patent No.: US 8,939,680 B2
(45) Date of Patent: Jan. 27, 2015

(54) METHOD AND STRUCTURE FOR IN SITU FIELD REPAIR OF SEVERED DRAIN TILE

(71) Applicant: Hamman IP LLC, Mt. Sterling, OH (US)

(72) Inventor: Carl R. Hamman, Mt. Sterling, OH (US)

(73) Assignee: Hamman IP LLC, Mt. Sterling, OH (US)

( * ) Notice: Subject to any disclaimer, the term of this patent is extended or adjusted under 35 U.S.C. 154(b) by 0 days.

(21) Appl. No.: 14/285,674

(22) Filed: May 23, 2014

(65) Prior Publication Data

US 2014/0348591 A1    Nov. 27, 2014

Related U.S. Application Data

(60) Provisional application No. 61/826,518, filed on May 23, 2013.

(51) Int. Cl.
    *F16L 1/06* (2006.01)
    *F16L 1/028* (2006.01)

(52) U.S. Cl.
    CPC .. *F16L 1/028* (2013.01); *F16L 1/06* (2013.01)
    USPC .................................................. 405/184.4

(58) Field of Classification Search
    CPC ..................................... F16L 3/00; F16L 3/26
    USPC ................... 405/157, 184.1, 184.2, 184.4
    See application file for complete search history.

(56) References Cited

U.S. PATENT DOCUMENTS

| | | | | |
|---|---|---|---|---|
| 3,993,192 | A * | 11/1976 | Bunn | 405/157 |
| 4,063,429 | A * | 12/1977 | Wilson | 405/157 |
| 4,069,684 | A * | 1/1978 | Wilson | 405/157 |
| 5,160,218 | A * | 11/1992 | Hill | 405/184.4 |
| 5,385,430 | A * | 1/1995 | Connors | 405/157 |
| 6,413,018 | B1 * | 7/2002 | Klaymar | 405/184.4 |
| 7,074,305 | B2 * | 7/2006 | Connors | 405/184.4 |
| 7,223,052 | B1 * | 5/2007 | Evans | 405/184.4 |
| 7,344,338 | B2 * | 3/2008 | Willis et al. | 405/184.4 |
| 7,771,140 | B2 * | 8/2010 | Jinnings et al. | 405/184.4 |
| 8,177,457 | B2 * | 5/2012 | Boudreaux, Jr. | 405/157 |
| 8,568,061 | B2 * | 10/2013 | Kalinowski et al. | 405/184.4 |
| 8,864,414 | B1 * | 10/2014 | Webb | 405/157 |
| 2004/0265068 | A1 * | 12/2004 | Guedes De Melo et al. | 405/184.4 |
| 2010/0074687 | A1 * | 3/2010 | Boudreaux, Jr. | 405/114 |
| 2010/0158614 | A1 * | 6/2010 | Kalinowski et al. | 405/184.4 |

* cited by examiner

*Primary Examiner* — Frederick L Lagman
(74) *Attorney, Agent, or Firm* — Mueller Law, LLC; Jerry K. Mueller, Jr.

(57) ABSTRACT

The current disclosure is a structure for repairing drain tile or any other conduit found in the construction of underground utilities, which conduit severed by the digging of a ditch. The first element is spray-in-place or pre-manufactured polymeric foam, such as polyurethane foam, that is placed so as to span the ditch and rest upon a pipeline located in the ditch. Next, sandbags, foam shims, or similar slope adjustments are placed atop the foam. Finally, a stiff, elongate member (e.g., H-beam, I-Beam, guardrail) is placed atop the sandbags spanning the entire ditch from one end of the severed utility to the other end of the drain tile or other conduit. In broader contexts, the disclosed structure will find use in repairing severed conduit due to an excavation regardless of whether a utility lies in the ditch. Additionally, such pre-manufactured foam bridges can be used as breakers to support underground utilities, such as large pipe.

20 Claims, 4 Drawing Sheets

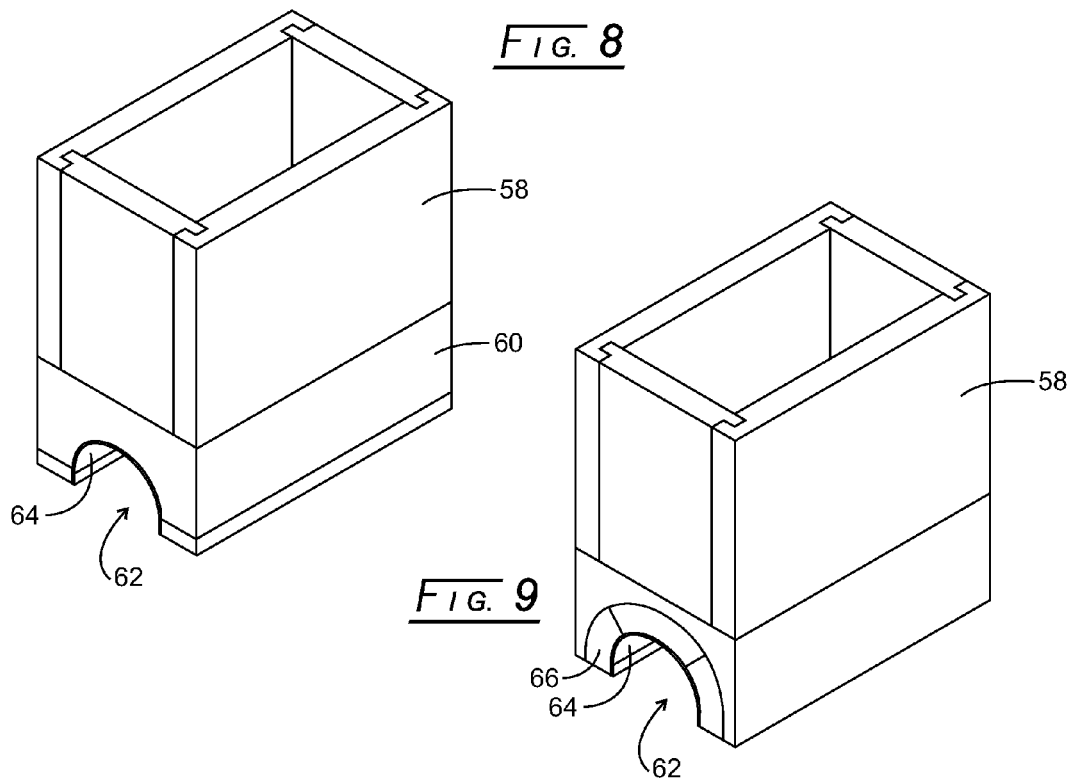
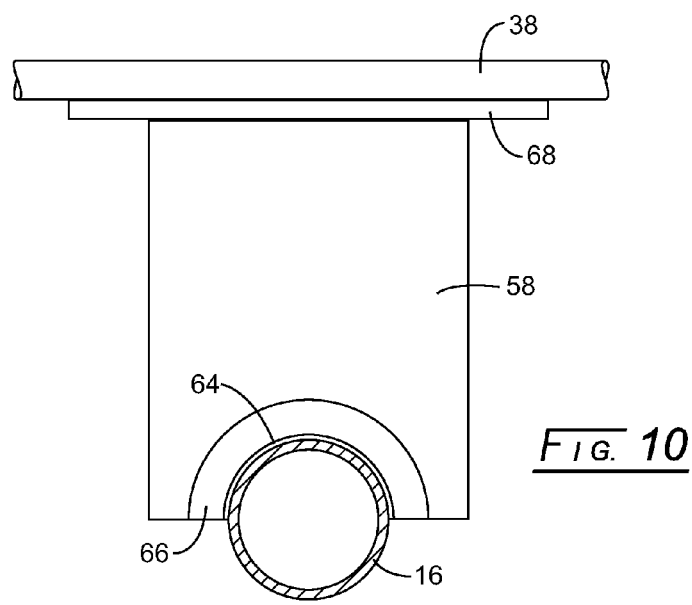

METHOD AND STRUCTURE FOR IN SITU FIELD REPAIR OF SEVERED DRAIN TILE

CROSS-REFERENCE TO RELATED APPLICATIONS

This application claims benefit of provisional application Ser. No. 61/826,518, filed May 23, 2013.

STATEMENT REGARDING FEDERALLY SPONSORED RESEARCH

Not applicable.

BACKGROUND

The present disclosure generally relates to repair of pipe in the field (in situ) and more particularly to repair of pipe cut during the laying of utilities, such as, inter alia, large diameter pipe.

Large diameter gas pipeline, for example, is laid in ditches, usually over large distances. This also is true of other utilities. It would be uneconomic to circumvent each and every drain tile or drainage pipe encountered. Thus, the gas pipeline contractor during excavation of the ditch cuts the drain tiles encountered in order to save time and money. A crew, then, goes back and repairs each cut drain tile in the field.

It is to such drain tile repair in the field and a new breaker that the present disclosure is primarily directed.

BRIEF SUMMARY

The current disclosure is a structure for repairing drain tile or any other conduit found in the construction of underground utilities, which conduit severed by the digging of a ditch. The first element is spray-in-place or pre-manufactured polymeric foam, such as polyurethane foam, that is placed so as to span the ditch and rest upon a pipeline located in the ditch. Next, sandbags, foam shims, or similar slope adjustments are placed atop the foam. Finally, a stiff, elongate member (e.g., H-beam, I-Beam, guardrail) is placed atop the sandbags spanning the entire ditch from one end of the severed utility to the other end of the drain tile or other conduit. In broader contexts, the disclosed structure will find use in repairing severed conduit due to an excavation regardless of whether a utility lies in the ditch.

Additionally, such pre-manufactured foam bridges can be used as breakers to support underground utilities, such as large pipe. Final height and/or slope can be achieved by use of polymeric spray foam. Much cost savings and time can be realized by use of pre-manufactured breakers, foam shims, and/or polymeric foam spray.

BRIEF DESCRIPTION OF THE DRAWINGS

For a fuller understanding of the nature and advantages of the present media and process, reference should be had to the following detailed description taken in connection with the accompanying drawings, in which:

FIG. 8 is an isometric view of the FIG. 5 embodiment made from 2 different foams;

FIG. 9 is an alternative embodiment to that shown in FIG. 8; and

FIG. 10 is sectional view of the FIG. 9 embodiment also showing the drain tile being supported.

These drawings will be further described below.

DETAILED DESCRIPTION

While the instant description relates to a gas pipe ditch wherein a drain tile has been severed while digging the ditch for the gas pipe, such description merely is for illustrating the precepts of the present disclosure, which in its broadest precepts relates to a conduit severed while digging a ditch.

Figure 1:
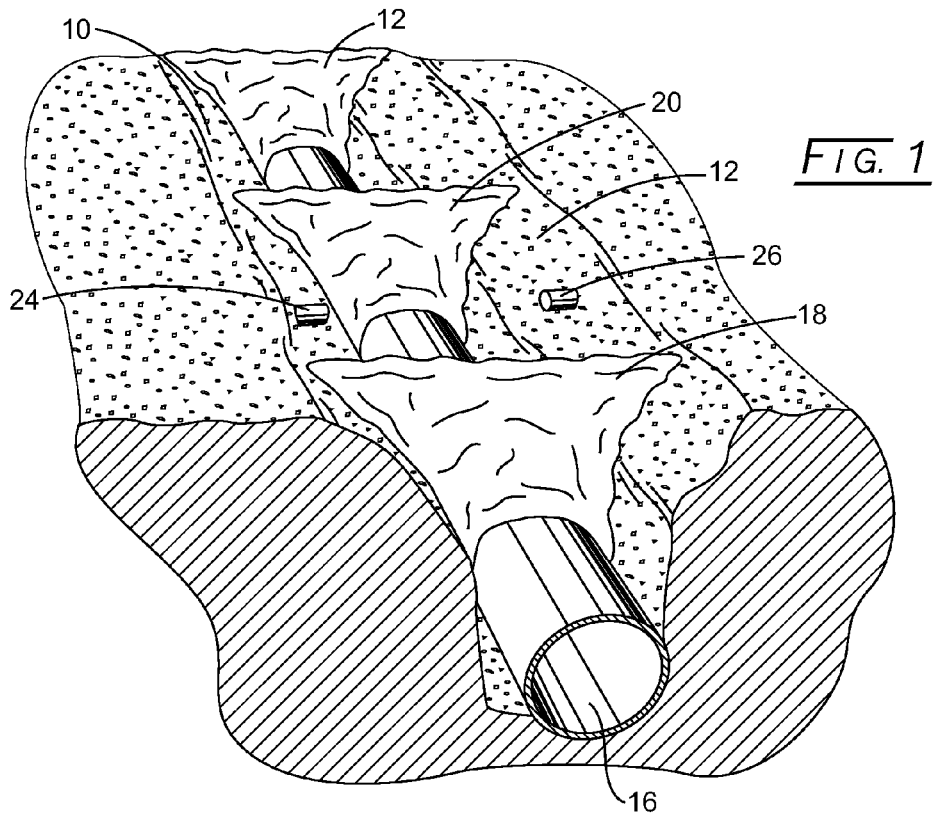
FIG. 1 is an isometric view of a large utility laid in a ditch in a field.

Referring initially to FIG. 1, a ditch is seen formed by a pair of sides, 10 and 12. Inside the ditch is a utility, 16, such as a natural gas pipeline. In order to support pipeline 16, such as, for example, a gas pipeline, a pier or base (not seen) of, for example, polyurethane (or other suitable material) foam is sprayed in the ditch for support of pipeline 16. Such foam sets very rapidly. Pipeline 16 is placed atop such foam piers (no shown in the drawings). Foam breakers, 18, 20, and 22, are spayed in place atop pipeline 16 for stopping free flow of water in the ditch. While a spray-in-place foam bridge often is used both beneath pipeline 16 and atop pipeline 16, it will be appreciated that preformed breakers and/or piers can be used to advantage for support of pipeline 16 and bridges 18, 20, and 22. Breakers normally are used only on sloping terrain, as earth typically will support pipeline 16 on level ground. Between adjacent foam breakers 18 and 10 are ends, 24 and 26, of severed drain tile severed during the digging of the ditch. It is not typical to encounter drain tile on very sloping ground. FIG. 1, then, is for illustration purposes of severed drain tile as well as the use of breakers to support pipeline on inclined terrain.

Figure 2:
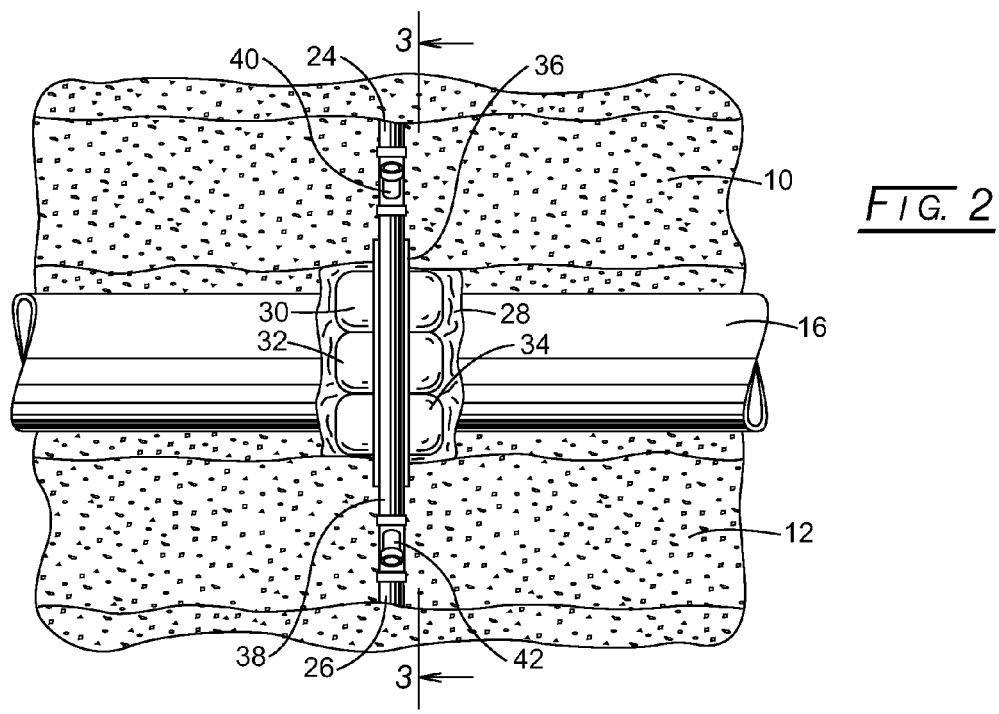
FIG. 2 is a top view of a drain tile repair structure, as disclosed herein.
Figure 3:
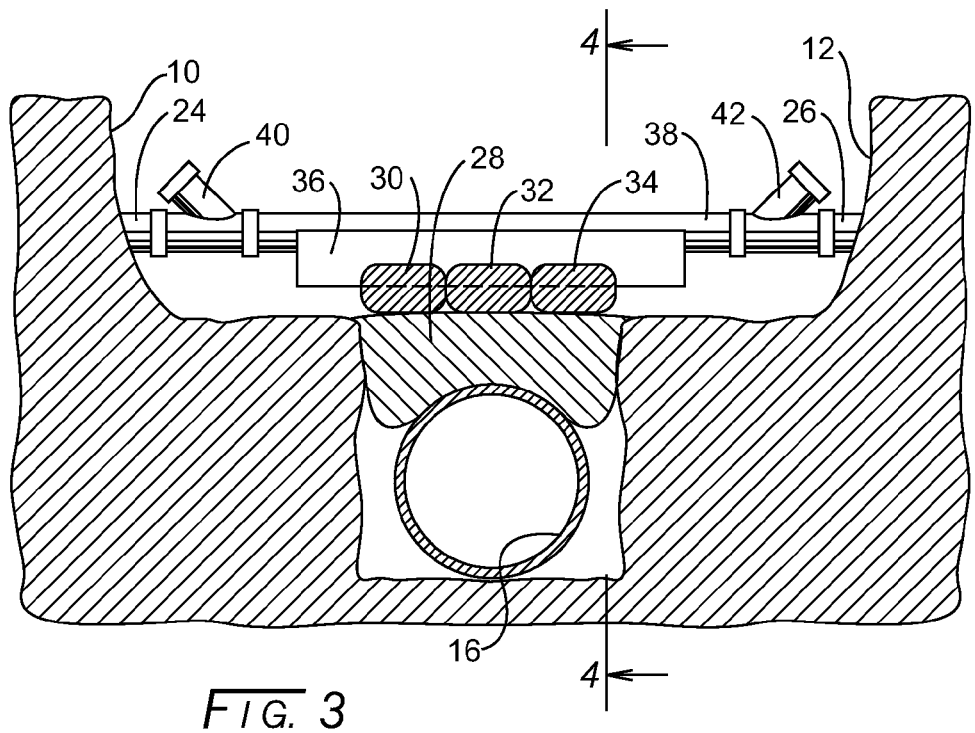
FIG. 3 is a side view of the drain tile repair structure of FIG. 2.
Figure 4:
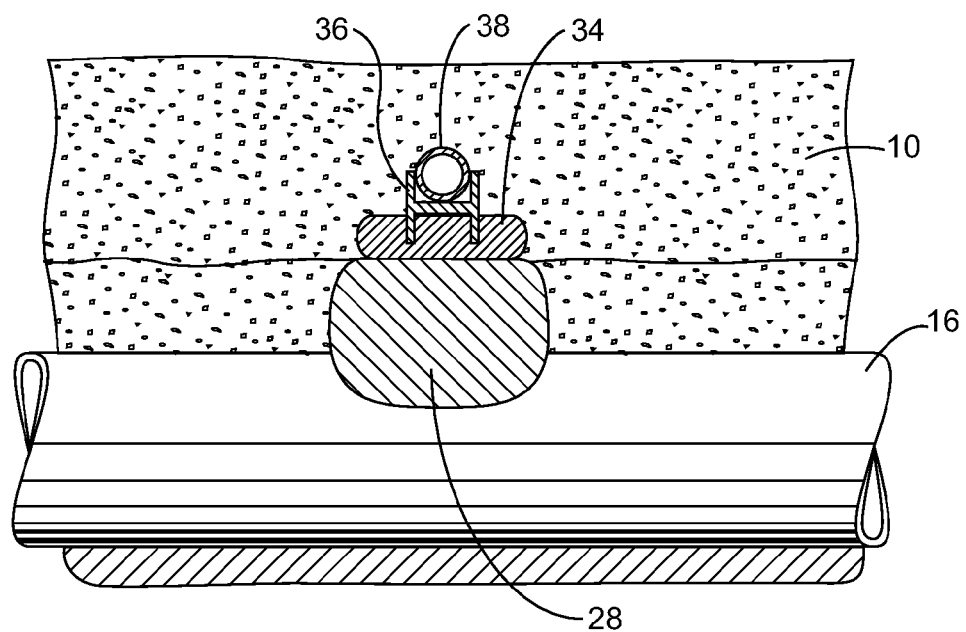
FIG. 4 is an end view of the drain tile repair structure of FIG. 2.

The structure for bridging the ditch for repair of the severed drain tile ends, 24 and 26 is illustrated in FIGS. 2-4. Referring to these drawings, a pre-formed bridge, 28, is created at the severed drain tile location. Such foam bridge not only will support the new drain tile section joining ends 24 and 26, but it also supports the sides 10 and 12 of the ditch to help prevent cave-ins. Sandbags, 30, 32, and 34, are placed atop bridge 28 so as to match the slope of a pipe that will span between severed drain tile ends 24 and 26. A stiff, elongate member, 36, (e.g., H-beam, I-Beam, or guardrail) is placed atop sandbags 30, 32, and 34 from drain tile end 24 and to drain tile end 26. Sandbags 30, 32, and 34 support stiff, elongate member 36 and are used to create the proper elevation and slope between drain tile ends 24 and 26.

It should be recognized that use of polymeric foam spray, polymeric shims, or other techniques might be used in place of the sandbags in order to achieve any desired slope.

The new drain tile section, 38, then, is placed securely in/atop H-beam 36. Note that drain tile section 38 has a pair of slanted inspection ports, 40 and 42, on either end. A camera can be inserted into either port 40 and 42 for inspection purposes, such as, for example, to ensure that drain tile section 38 was properly installed and mated with ends 24 and 26.

This structure has the added value of keeping workers from being down inside the ditch during the drain tile repair procedure. Both foam bridge 28 and sand bags 30, 32, and 34 keep H-beam 36 spaced apart from pipeline 16 to prevent any damage to the pipeline as well as to protect workers.

Figure 5:
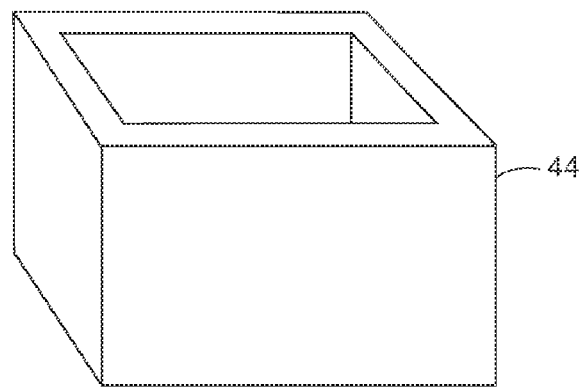
FIG. 5 is an isometric view of a top section of an additional embodiment foam breaker.
Figure 6:
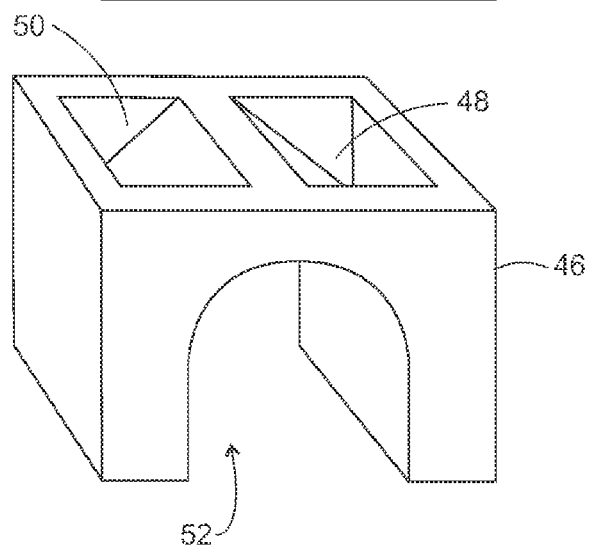
FIG. 6 is an isometric view of the bottom section of the additional embodiment foam breaker.

Referring to FIGS. 5 and 6, a rectangular annular top component, 44, that sits atop lower foam bridge component, 46. Lower foam bridge component 46 has a pair of opposing triangular cutouts, 48 and 50, into which a sand bag or other ballast can be placed. A lower semi-circular cutout, 52, fits atop a pipe, 54, (see FIG. 7) disposed within the ditch. Foam pieces 44 and 46 can be secured by adhesive in the field. Duct tape or similar tape can be used to additionally secure foam pieces 44 and 46 together.

It should be observed that with proper dimensioning, a total of 17 sandbags will fill the inner space of foam pieces 44 and 46. The weight of that number of sandbags counters the upward forces of water in the ditch that tend to cause the foam bridge to rise and press against elongate member 36 and new drain tile section 38.

Figure 7:
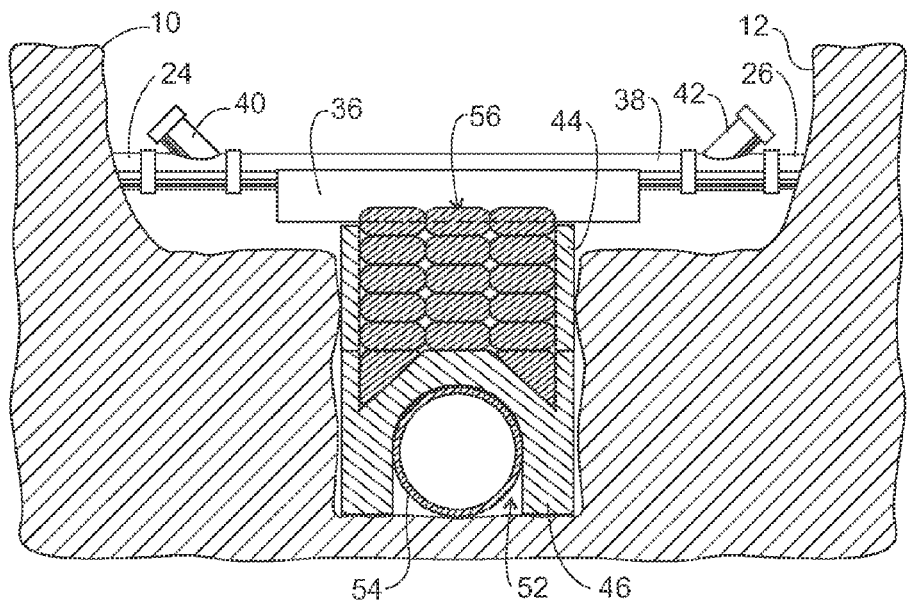
FIG. 7 is a sectional view like that in FIG. 4 employing the foam breaker components of FIGS. 5 and 6.

Referring to FIG. 7, an array of sandbags, 56, are seen housed within cavity formed by the combination of foam bridge components 44 and 46. The remaining items in FIG. 7 have been numbered as they are in FIG. 4 whereat their description can be found.

Referring to FIG. 8, a rectangular empty upper box, 58, made of one type of foam (e.g., expanded polystyrene) sits atop a lower rectangular box, 60, made of a second type of foam (e.g., expanded polypropylene) and having a lower semi-circular cut-out, 62, for hugging the pipe or drain tile. The composition of the lower section may aid in providing cathodic protection. A liner, 64, lines cut-out 62 to protect the pipeline and can be made from a variety of rubberized materials, such as, for example, expanded high density polyethylene (HDPE) exhibiting compressive strength and flexibility and extruded into a diamond mesh pattern (Denso Rock Shield HD, Denso North America, Houston, Tex.).

FIG. 9 shows an alternative embodiment to that shown in FIG. 9, where a semi-circular second foam liner, 66, is used instead of the lower rectangular box, 60. In FIG. 10 that is based on FIG. 9, a drain tile channel, 68, made of a fiberglass material is used as a seat for drain tile 38. Alternative designs to those of FIGS. 8 and 9 may be envisioned.

An additional use of pre-formed foam structures is as a foam breaker and a pier. Cut to standard width and length with variable height (or some other standards), a crew can take a few sizes from the factor and place them in the ditch as breakers (water dams) rather than to create such breakers with polymeric foam spray. Cost and labor savings can be achieve with pre-formed breakers. As described above, small cans of spray polymeric foam and/or polymeric foam shims can be used as is necessary, desirable, and/or convenient to achieve a desired slope, ensure full contact of the pre-formed breaker with the pipeline, or the like.

While the method and structure has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the US Engineering system and all amounts and percentages are by weight, unless otherwise expressly indicated. Also, all citations referred herein are expressly incorporated herein by reference.

I claim:

1. A structure for supporting repaired pipe severed in the construction of an underground utility, which pipe was severed by the digging of a utility ditch, said structure comprising:
    a polymer foam placed transverse to the longitudinal direction of the underground utility and placed atop the underground utility, said polymeric foam having a cavity at its top and semi-circular at its bottom;
    weight placed in the polymeric foam cavity for countering buoyancy forces in the ditch when back-filled with dirt;
    a support placed atop the foamed bridge and transverse to the longitudinal direction of the underground utility for supporting the repaired pipe spanning the ditch.

2. The structure of claim 1, used in underground utility pipe.

3. The structure of claim 1, wherein said weight comprising sandbags.

4. The structure of claim 1, wherein said support comprises an elongate metal piece.

5. The structure of claim 1, wherein support comprises an elongate fiberglass piece.

6. The structure of claim 1, wherein said polymer foam is one or more of foamed polyethylene, foamed polypropylene, or foamed polystyrene.

7. The structure of claim 1, wherein a liner lines the foamed bridge semi-circular bottom.

8. The structure of claim 7, wherein said liner is a rubberized material.

9. The structure of claim 8, wherein fiberglass is located between the rubberized material and the foamed bridge semi-circular bottom.

10. A method for supporting repaired pipe severed in the construction of an underground utility, which pipe was severed by the digging of a utility ditch, which comprises the steps of:
    (a) placing a polymeric foam piece over the underground utility transverse to the longitudinal direction of the underground utility and placed atop the underground utility, said polymer foam piece having a cavity at its top and semi-circular at its bottom;
    (b) placing weight placed in the polymeric foam cavity for countering buoyancy forces in the ditch when back-filled with dirt; and
    (c) placing support a under the repaired pipe spanning the ditch for supporting the repaired pipe spanning the ditch.

11. The method of claim 10, wherein the underground utility comprises underground utility pipeline.

12. The method of claim 10, wherein said weight comprising sandbags.

13. The method of claim 10, wherein said support a comprises an elongate metal piece.

14. The method of claim 10, wherein said support a comprises an elongate fiberglass piece.

15. The method of claim 10, wherein said polymer foam is one or more of foamed polyethylene, foamed polypropylene, or foamed polystyrene.

16. The method of claim 10, which additionally comprises the steps of:
    (d) repairing the severed pipe; and
    (e) providing inspection ports slanting away from the underground utility in the repaired pipe for later remote inspection should the repaired pipe become clogged.

17. The method of claim 10, wherein said severed pipe comprises severed drain tile.

18. The method of claim 10, further comprising placing a liner between the polymeric foam piece semi-circular bottom and the underground utility.

19. The method of claim 18, wherein said liner is formed from a rubberized material.

20. The method of claim 19, wherein fiberglass is placed between the rubberized material and the polymeric foam piece semi-circular bottom.

* * * * *